J. S. & T. B. Atterbury,
Glass Mold
N° 57,063. Patented Aug. 14, 1866.
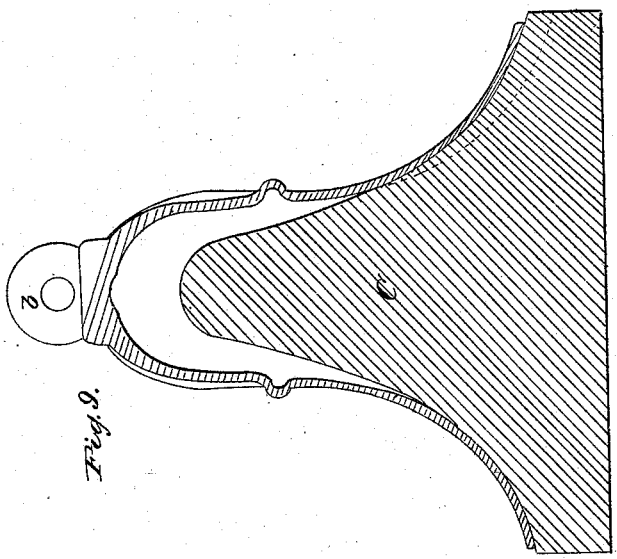
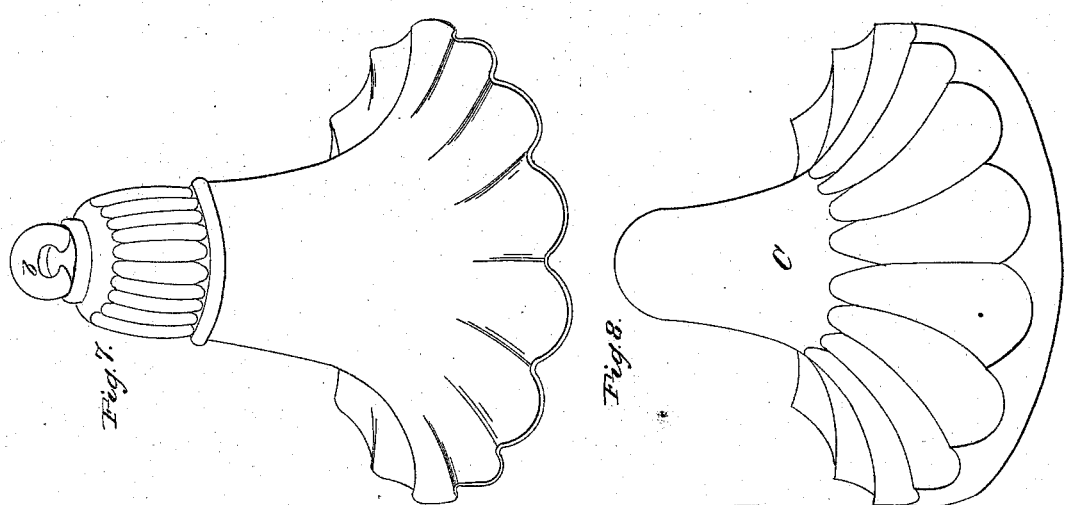

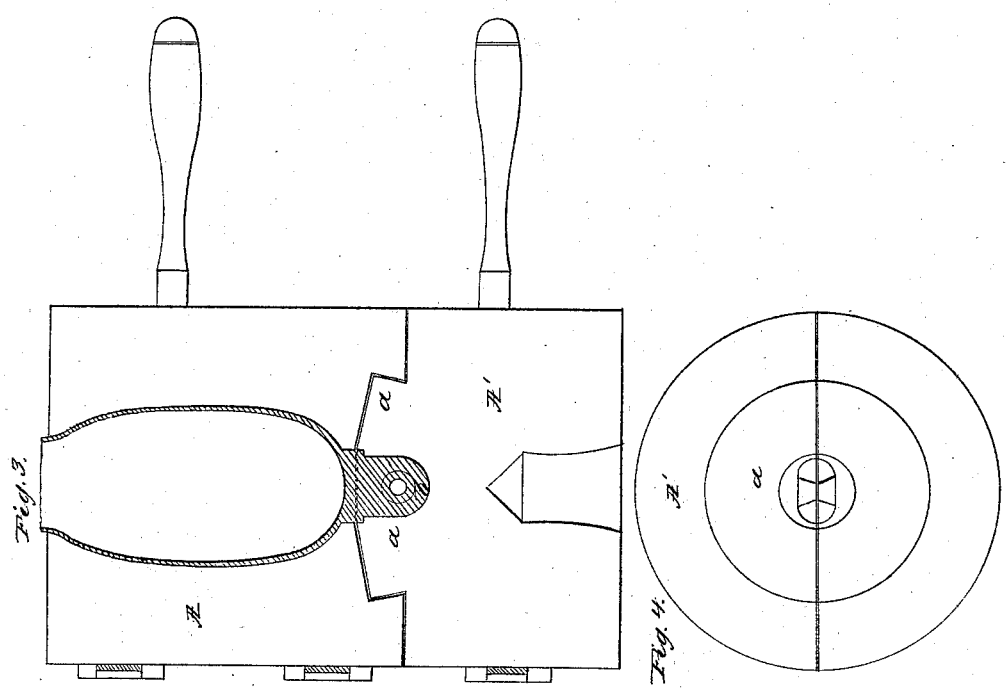
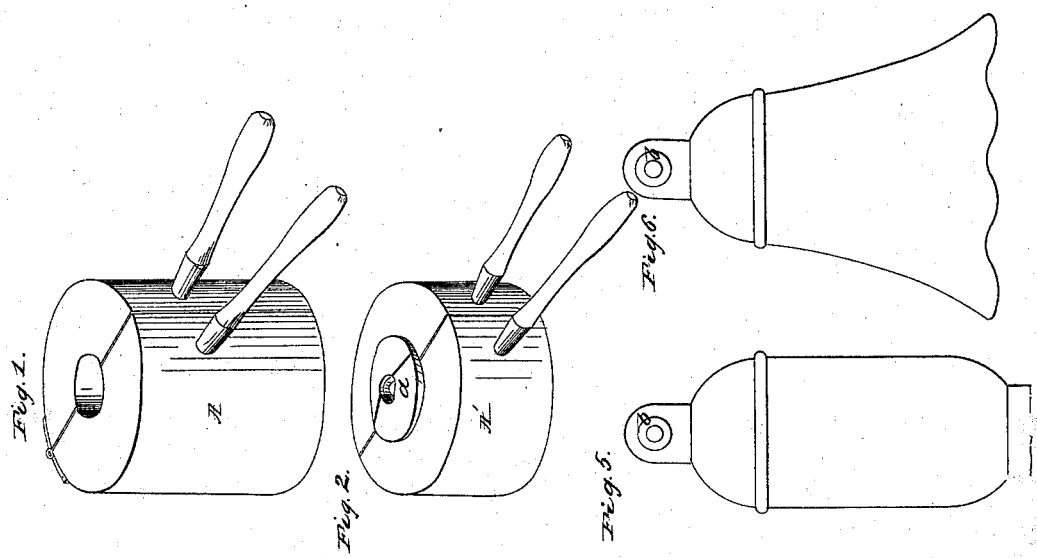

UNITED STATES PATENT OFFICE.

J. S. ATTERBURY AND T. B. ATTERBURY, OF PITTSBURG, PENNSYLVANIA.

IMPROVED METHOD OF MAKING SMOKE-BELLS.

Specification forming part of Letters Patent No. 57,063, dated August 14, 1866.

*To all whom it may concern:*

Be it known that we, J. S. ATTERBURY and T. B. ATTERBURY, both of Pittsburg, in the county of Allegheny and State of Pennsylvania, have invented a new and Improved Method of Making Smoke-Bells; and we do hereby declare that the following is a full, clear, and exact description thereof, reference being had to the accompanying drawings, making a part of this specification, in which—

Figure 1 is a perspective view of the upper part of the divided mold. Fig. 2 is a perspective view of the lower half of the mold. Fig. 3 is a view of one-half of the two molds put together, showing the form of the glass bell when molded in the same. Fig. 4 is a top view of the lower portion of the mold. Fig. 5 shows the form of the molded glass preparatory to shaping the lower end. Fig. 6 is a side view of a complete smoke-bell. Figs. 7, 8, and 9 show the manner of finishing the bells after they have been taken from the molds.

Similar letters of reference indicate corresponding parts in the several figures.

This invention relates to an improved mode of making glass smoke-bells, which are used for protecting the ceilings of rooms from being smoked, by suspending them from the ceiling over lamp or gas burners.

The object of our invention is to provide for casting such bells in molds, and crimping or fluting the edges of the bells upon forming or crimping blocks, as will be hereinafter described.

To enable others skilled in the art to understand our invention, we will describe its construction and operation.

In the accompanying drawings, A A′ represent the two sections of the mold, within which the bells are formed preparatory to flaring their lower ends upon the crimping-block C, which is shown in Figs. 8 and 9, Sheet 2.

The two portions A A′ are united together by means of a circular dovetail tenon, *a*, fitting snugly into a corresponding recess, which is formed in the lower end of the upper portion, A. The two portions A A′ are each diametrically divided, as shown in the drawings, and these half-sections are hinged together so that they can be opened for removing the molded bells from them.

The form of the chamber in the upper portion, A, is cylindrical, terminating at the ends in circular contracted spaces, as shown in Fig. 3, so as to produce the form shown in Fig. 5. The upper opening of the section A should be of sufficient size to allow of the introduction of the proper amount of glass to form a bell. The lower opening forms a portion of the contracted neck of the bell.

The opening which is made in the top of the lower portion, A′, is adapted to form the loop or eye *b* on the top of the bell, by which the bell is suspended from a cord or chain.

The glass is first put into the opening in the top of portion A′; then the two parts of the mold are brought together, as shown in Fig. 3, when the body of the bell is formed by blowing the glass into the upper chamber, during which operation the portion (loop) which is in the lower cavity will attach itself to the body of the bell.

When the molds are opened the glass is removed, reheated, and shaped by pressing it over the fluted former shown in Figs. 8 and 9.

By our improved mode of producing smoke-bells they can be made of a uniform size and shape, and any ordinary workman can make them, as the most difficult part of the work is formed in the molds. By thus constructing the bells they can be made highly ornamental, and finished so as to present a beautiful appearance, without requiring the labor of skillful workers in glass. Consequently the bells can be produced at a much cheaper rate than those made by hand.

Having thus described our invention, what we claim as new, and desire to secure by Letters Patent, is—

The method, substantially as herein described, of producing glass smoke-bells and other articles, consisting in blowing the glass in divided molds, and then shaping the bells over conical fluted formers, substantially as set forth.

J. S. ATTERBURY.
T. B. ATTERBURY.

Witnesses:
 A. B. STEVENSON,
 JAS. A. McLEAN.